(12) United States Patent
Kephart et al.

(10) Patent No.: US 7,668,623 B2
(45) Date of Patent: Feb. 23, 2010

(54) STEAM TEMPERATURE CONTROL USING INTEGRATED FUNCTION BLOCK

(75) Inventors: Richard W. Kephart, Kittanning, PA (US); Charles H. Menten, Gibsonia, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 87 days.

(21) Appl. No.: 11/780,969

(22) Filed: Jul. 20, 2007

(65) Prior Publication Data
US 2008/0029261 A1 Feb. 7, 2008

Related U.S. Application Data

(60) Provisional application No. 60/821,083, filed on Aug. 1, 2006.

(51) Int. Cl.
| | |
|---|---|
| G05D 23/00 | (2006.01) |
| G05D 11/00 | (2006.01) |
| G05D 7/00 | (2006.01) |
| G05B 13/00 | (2006.01) |
| G01M 1/38 | (2006.01) |

(52) U.S. Cl. ................................. 700/275; 700/283
(58) Field of Classification Search ............. 700/40–46, 700/275, 281–283, 286, 287, 299, 300; 318/609, 318/610
See application file for complete search history.

(56) References Cited

U.S. PATENT DOCUMENTS

| | | | | |
|---|---|---|---|---|
| 3,939,328 | A | * | 2/1976 | Davis ........................... 700/41 |
| 4,241,701 | A | | 12/1980 | Morse ......................... 122/460 |
| 4,453,495 | A | * | 6/1984 | Strohmeyer, Jr. ............. 122/4 D |
| 4,556,956 | A | * | 12/1985 | Dickenson et al. ............. 700/42 |
| 4,707,324 | A | * | 11/1987 | Storrick ....................... 376/215 |
| 4,791,889 | A | * | 12/1988 | Matsko et al. ............. 122/479.1 |

(Continued)

FOREIGN PATENT DOCUMENTS

JP 57179513 11/1982

(Continued)

OTHER PUBLICATIONS

Foreign Search Report for Great Britain Application No. GB0715005.5, dated Nov. 15, 2007.

*Primary Examiner*—M. N. Von Buhr
(74) *Attorney, Agent, or Firm*—Marshall, Gerstein & Borun LLP

(57) ABSTRACT

The disclosure is directed to a saturated water spraying system configured to rapidly respond to rapid load changes by implementing a single integrated DCS control block. The integrate DCS control block may include a plurality of process control routines that are necessary to control the operation of the spraying system. For example, upstream and downstream PID control routines may determine and output control variables, and other control routines may be provided as necessary to handle disturbances within a boiler affecting the outlet and spray steam temperatures, and to ensure that the steam temperatures do not fall into the saturation region during operation of the boiler. Because the routines are part of the same control block, the common storage for the control block may be accessed by each of the routines without the necessity of establishing additional communication links for transferring the information as is required when using cascaded function blocks.

24 Claims, 4 Drawing Sheets

U.S. PATENT DOCUMENTS

| | | | | |
|---|---|---|---|---|
| 4,888,953 A | * | 12/1989 | Fukayama et al. | 60/657 |
| 4,908,747 A | * | 3/1990 | Lane et al. | 700/42 |
| 5,207,379 A | * | 5/1993 | Hurmi et al. | 236/9 R |
| 5,268,835 A | * | 12/1993 | Miyagaki et al. | 700/31 |
| 5,809,943 A | * | 9/1998 | Olia | 122/451 S |
| 6,269,286 B1 | * | 7/2001 | Tse et al. | 700/271 |
| 6,424,873 B1 | | 7/2002 | Przybylski | 700/42 |
| 6,681,155 B1 | * | 1/2004 | Fujita et al. | 700/287 |
| 6,721,609 B1 | * | 4/2004 | Wojsznis et al. | 700/28 |
| 6,766,646 B1 | * | 7/2004 | Ford et al. | 60/646 |
| 6,767,178 B2 | * | 7/2004 | Staroselsky et al. | 415/1 |
| 6,886,502 B1 | * | 5/2005 | Srinivasan | 122/451.1 |
| 6,901,300 B2 | * | 5/2005 | Blevins et al. | 700/46 |
| 7,028,480 B2 | * | 4/2006 | Sekiai et al. | 60/646 |
| 2004/0081549 A1 | * | 4/2004 | Shapiro et al. | 415/1 |

FOREIGN PATENT DOCUMENTS

| | | |
|---|---|---|
| JP | 5087307 | 4/1993 |
| JP | 7110108 | 4/1995 |

* cited by examiner

STEAM TEMPERATURE CONTROL USING INTEGRATED FUNCTION BLOCK

REFERENCE TO RELATED APPLICATION

The present application claims priority from U.S. Provisional Application No. 60/821,083, filed on Aug. 1, 2006, which is expressly incorporated by reference herein.

FIELD OF TECHNOLOGY

The present invention relates generally to steam temperature control in boilers and more particularly, to steam temperature control in utility boilers using integrated DCS control blocks for increased responsiveness to rapid load changes.

DESCRIPTION OF THE RELATED ART

Electric power plants generate electricity using various types of power generators which may be categorized, depending on the energy used to generate electricity, into thermal, nuclear, wind, hydroelectric and the like. Each of these various types of generators operates under different sets of constraints. For example, an output of a thermal generator is a function of the amount of heat generated in a boiler, wherein the amount of heat is determined by the amount of fuel that can be burned per hour, etc. Additionally, the output of the thermal generator may also be dependent upon the heat transfer efficiency of the boiler used to burn the fuel. Similar types of constraints exist with other types of electric power plants. Moreover, for most power plants using boilers, the desired steam temperature set-points at final super-heater and re-heater outlets are constant and it is necessary to maintain steam temperature close to the set-points within a narrow range at all load levels.

Fuel burning electric power generators operate by burning fuel to generate steam from water traveling through a number of pipes and tubes in the boiler. The steam is used to generate electricity in one or more turbines. In operation of utility boilers, control of steam temperature is critical. It is important that the temperature of steam exiting from a boiler and entering a steam turbine is at an optimally desired temperature. If the steam temperature is too high, it may cause damage to the blades of the steam turbine for various metallurgical reasons. If the steam temperature is too low, it may contain water particles which may cause damage to components of the steam turbine.

Typically, a boiler contains cascaded heat exchanger sections where the steam exiting from one heat exchanger section enters the following heat exchanger section with the temperature of the steam increasing at each heat exchange section until, ideally, the steam is output to the turbine at the desired steam temperature. In such an arrangement, control of the steam temperature is often achieved by spraying saturated water into the steam at a point before the final heat exchanger section, where such a heat exchanger section is located immediately upstream of the turbine. Temperature sensors are provided along the steam flow path and between the heat exchanger sections to measure the steam temperature at critical points along the flow path, and the measured temperatures are used to regulate the amount of saturated water sprayed into the steam for temperature control purposes.

In traditional boiler operations, a distributed control system (DCS) is used wherein a number of discrete function blocks arranged into a cascaded configuration implement a steam temperature control strategy. FIG. 1 illustrates one example of a saturated water spraying system 10 having a cascaded function block configuration for controlling the outlet steam temperature $TE_{OUTLET}$ of steam being provided by the spraying system 10 to a turbine of a utility boiler. Steam entering the flow path of the spraying system 10 passes through a first heat exchanger 12 and a second heat exchanger 14, and is then output to the turbine. The outlet steam temperature $TE_{OUTLET}$ is regulated by providing a spray of saturated water to the steam in the flow path at a point between the heat exchangers 12, 14. A valve 16 provided to control the amount of saturated water sprayed into the steam in the flow path. The control valve 16 is controlled by the cascaded function blocks 18-24 that use the outlet steam temperature $TE_{OUTLET}$ measured by a temperature sensor 26 and the post-spray steam temperature $TE_{SPRAY}$ measured by a temperature sensor 28 to determine the valve position necessary to achieve the desired outlet steam temperature $TE_{OUTLET}$.

The outlet steam temperature $TE_{OUTLET}$ measured by the temperature sensor 26 is input to a first proportional integral derivative (PID) function block 18 as the first or upstream process variable $PV_1$ of the control strategy. As used herein, the terms "upstream" and "downstream" refer to the flow of process control information in the control loop as opposed to the direction of the steam flow in the flow path to the turbine. A first set point $SP_1$ representing the desired value of the outlet steam temperature $TE_{OUTLET}$ is also input to the PID function block 18. In many applications, the optimal value for the outlet steam temperature $TE_{OUTLET}$ is approximately 1000° F. The PID function block 18 is configured to compare the values of the upstream process variable $PV_1$ and the first set point $SP_1$ to determine whether the post-spray steam temperature $TE_{SPRAY}$ should be increased ($PV_1 < SP_1$) or decreased ($PV_1 > SP_1$). As long as the outlet steam temperature $TE_{OUTLET}$ is different than the first set point $SP_1$, the post-spray steam temperature $TE_{SPRAY}$ will be adjusted and the PID function block 18 outputs a first control variable $CV_1$ having a value equal to the post-spray steam temperature $TE_{SPRAY}$ determined by the PID function block 18.

Before determining the control valve position necessary to achieve the post-spray steam temperature $TE_{SPRAY}$ determined by the PID function block 18, the control strategy compensates for disturbances within the spraying system 10 and the boiler that affect the steam temperature and that are immediately correctible without waiting for feedback and evaluation by a PID function block. For example, a change in the steam flow rate causes a change in the amount of heat transferred to the steam, and correspondingly the magnitude of the change in the steam temperature, as the steam flows through the heat exchangers 12, 14. These changes occur in a predictable way. As a result, one or more summation function blocks 20 may be included in the cascade configured to adjust the first control variable $CV_1$ to compensate for these types of disturbances. The summation function block 20 is configured to receive the first control variable $CV_1$ and a feed forward signal FF indicative of the value or change in the value of the parameter affecting the spraying system 10, such as a signal indicating the amount of change in the steam flow rate. The summation function block 20 uses the feed forward signal FF to determine how much the post-spray steam temperature $TE_{SPRAY}$ must be adjusted to compensate for the disturbance. For example, the temperature $TE_{SPRAY}$ must be increased if the flow rate increases and decreased if the flow rate decreases. The summation function block 20 makes the necessary adjustment (increase or decrease) to the first control variable $CV_1$ and outputs an intermediate control variable $CV_1$ representing the adjusted temperature $TE_{SPRAY}$. As previously mentioned, multiple summation function blocks 20 may be implemented to compensate for the various disturbances that may be present.

The cascaded function block configuration may further include a HISELECT (>) function block 22 to ensure that the action of spraying saturated water into the steam does not result in the steam transitioning from the superheated region to the saturation region, thereby avoiding the risk of water induction into the turbine. Based on the operating conditions within the boiler and, in particular, within the steam flow path between the heat exchangers 12, 14, the saturation temperature at which the superheated steam will change to saturated water is determinable from the standard steam tables. The HISELECT function block 22 is configured to receive the intermediate control variable $CV_1$ representing the desired temperature $TE_{SPRAY}$ calculated by the upstream function blocks 18, 20, and to receive a further input of the saturation override temperature $TE_{SAT}$ for the current conditions within the steam flow path, and to output the greater of the two input temperatures as the second set point $SP_2$. Therefore, if the intermediate control variable $CV_1$ is greater then the saturation override temperature $TE_{SAT}$, the calculated temperature is output as the second set point $SP_2$. Otherwise, the saturation override temperature $TE_{SAT}$ is output as the second set point $SP_2$ to prevent the post-spray steam temperature $TE_{SPRAY}$ from falling into the saturation region. Depending on the implementation, the HISELECT function block 22 may be omitted if little to no risk exists for the steam to transition to saturated water. Although the fundamental components of the control strategy are the PID function blocks 18, 24, in practice most all control strategies include additional function blocks, such as the summation and HISELECT function blocks 20, 22, respectively, to address the various other effects that are associated with a particular boiler configuration.

After the desired post-spray steam temperature $TE_{SPRAY}$ is calculated and, if necessary, adjusted, the second set point $SP_2$ output by the HISELECT function block 22 is input to a second or downstream PID function block 24 to determine the position of the control valve 16 necessary to raise or lower the temperature $TE_{SPRAY}$. The downstream PID function block 24 is configured to receive the second set point $SP_2$ from the HISELECT function block 22 as one input, and to receive the post-spray steam temperature $TE_{SPRAY}$ as measured by the temperature sensor 28 as a second process variable $PV_2$. The downstream PID function block 24 is further configured to evaluate the difference between the second set point $SP_2$ and the second process variable $PV_2$, and to output a second control variable $CV_2$ to the control valve 16 representing the desired valve position such that the amount of saturated water sprayed into the steam flow path will result in the post-spray steam temperature $TE_{SPRAY}$ measured by the temperature sensor 28 equaling the desired temperature $TE_{SPRAY}$ as represented by the second set point $SP_2$.

This type of control strategy and cascaded function block configuration work well under normal conditions. However, under conditions of rapid load changes, the post-spray steam temperature $TE_{SPRAY}$ may change very quickly such that the difference between the second process variable $PV_2$ and the second set point $SP_2$ will prevent the downstream PID function block 24 from outputting a valve position as second control variable $CV_2$ that will result in the desired outlet steam temperature $TE_{OUTLET}$. Such conditions may occur during a rapid reduction in the steam flow rate. The same amount of heat energy is present in the heat exchanger 14 and in the saturated water being sprayed into the flow path, but the reduced mass of steam in the flow path results in rapid temperature changes. Consequently, the steam temperature $TE_{OUTLET}$ at the output of the heat exchanger 14 increases rapidly causing the PID function block 18 to attempt to lower the temperature $TE_{OUTLET}$ by closing the valve 16, while at the same time the steam temperature $TE_{SPRAY}$ decreases rapidly as the saturated water mixes with the steam causing the PID function block 24 to close the valve.

If the steam temperature $TE_{SPRAY}$ decreases to the point where the second process variable $PV_2$ is less than the second set point $SP_2$, the downstream PID function block 24 interprets the steam temperature $TE_{SPRAY}$ as being too low and will not output a second control variable $CV_2$ to open the control valve 16 even though saturated water is needed to reduce the outlet steam temperature $TE_{OUTLET}$. For example, the reduced steam flow rate may cause the temperature $TE_{SPRAY}$ and, consequently, the second process variable $PV_2$, to rapidly drop to 700° F., while the increased outlet steam temperature $TE_{OUTLET}$ may result in the second set point $SP_2$ input to the downstream PID function block 24 having a value of 850° F. based on the calculations of the upstream PID function block 18. The difference of –150° F. indicates to the downstream PID function block 24 that the control valve 16 should remain closed, and the control valve 16 will not be opened until the second set point $SP_2$ drops below 700° F. Consequently, the outlet steam temperature $TE_{OUTLET}$ will continue to rise, and the upstream PID controller 18 will continue reducing the first control variable $CV_1$ until the second set point $SP_2$ falls below the temperature $TE_{SPRAY}$, which may require many cycles of the control loop.

The rapid loading condition results in an induced delay in control action and a reduction in the effectiveness of the control strategy. In practice, field engineers and tuners employ a number of ad hoc circuits to detect and remedy this situation. For example, the downstream PID function block 24 could be configured to determine whether the outlet steam temperature $TE_{OUTLET}$ requires the opening of the control valve 16 even though the second set point $SP_2$ and second process variable $PV_2$ indicate that the control valve 16 should remain closed. However, this solution requires that PID function block 24 be provided with all the other inputs to the intermediate function blocks 20, 22 in order to back out all the adjustments. Alternatively, the difference between the second set point $SP_2$ and second process variable $PV_2$ and an indication that the control valve 16 is closed could be fed back to the upstream PID function block 18. Either solution would necessitate adding additional communication links to transmit the additional information to the PID function blocks 18, 24. Therefore, a need exists for improved apparatus and methods for handling rapid loading conditions in the spraying system 10 and, if possible, without requiring additional communication links for communicating the variables present in the spraying system 10.

SUMMARY

In one aspect, the invention is directed to a saturated water spraying system configured to rapidly respond to rapid load changes by implementing a single integrated DCS control block. The integrate DCS control block may include a plurality of process control routines that are necessary to control the operation of the spraying system. For example, upstream and downstream PID control routines may determine and output control variables, and other control routines may be provided as necessary to handle disturbances within the boiler affecting the outlet and spray steam temperatures, and to ensure that the steam temperatures do not fall into the saturation region during operation of the boiler. Because the routines are part of the same control block, the common storage for the control block may be accessed by each of the routines without the necessity of establishing additional communication links for transferring the information as is required when using cascaded function blocks. By integrating the control functions in the same control block, mechanisms and processing can be provided within the integrated control block to allow the downstream PID routine to provide the upstream PID routine with an indication of the first control variable and/or second set point that are necessary to cause the downstream PID routine to properly adjust the control valve for control of the outlet steam temperature. Alternatively, the upstream PID routine may be able to provide the downstream PID routine with an indication of the difference between the first set point and the first process variable so that the downstream PID routine may be able to override the calculated second control variable and properly adjust the control valve. Consequently, the integrated DCS control block may facilitate implementation of a more aggressive control strategy that may more quickly respond to rapid load changes within the spraying system.

Additional aspects of the invention are defined by the claims of this patent.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
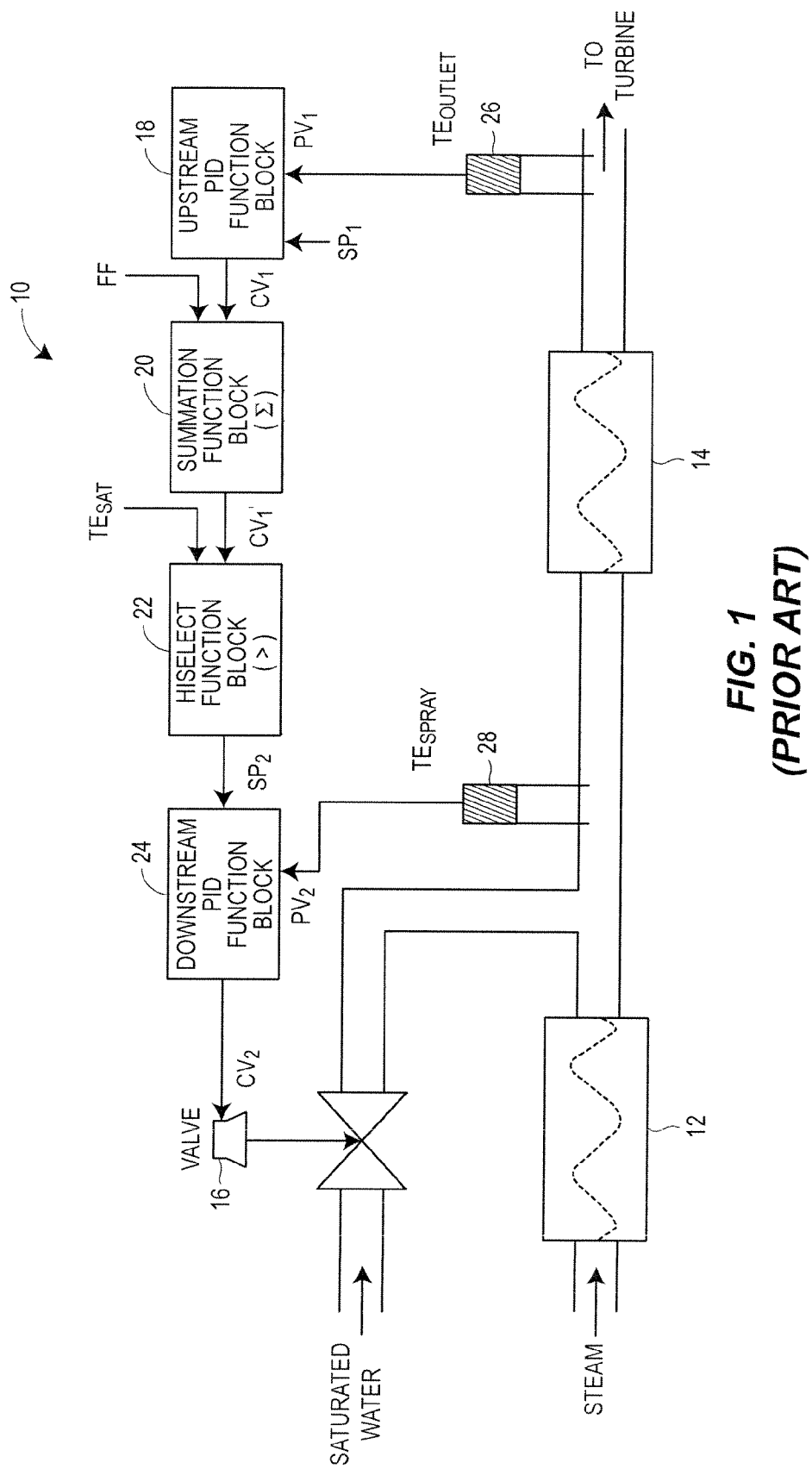
FIG. 1 is a schematic block diagram of a saturated water spraying system used in a boiler and including a cascaded PID control loop.
Figure 2:
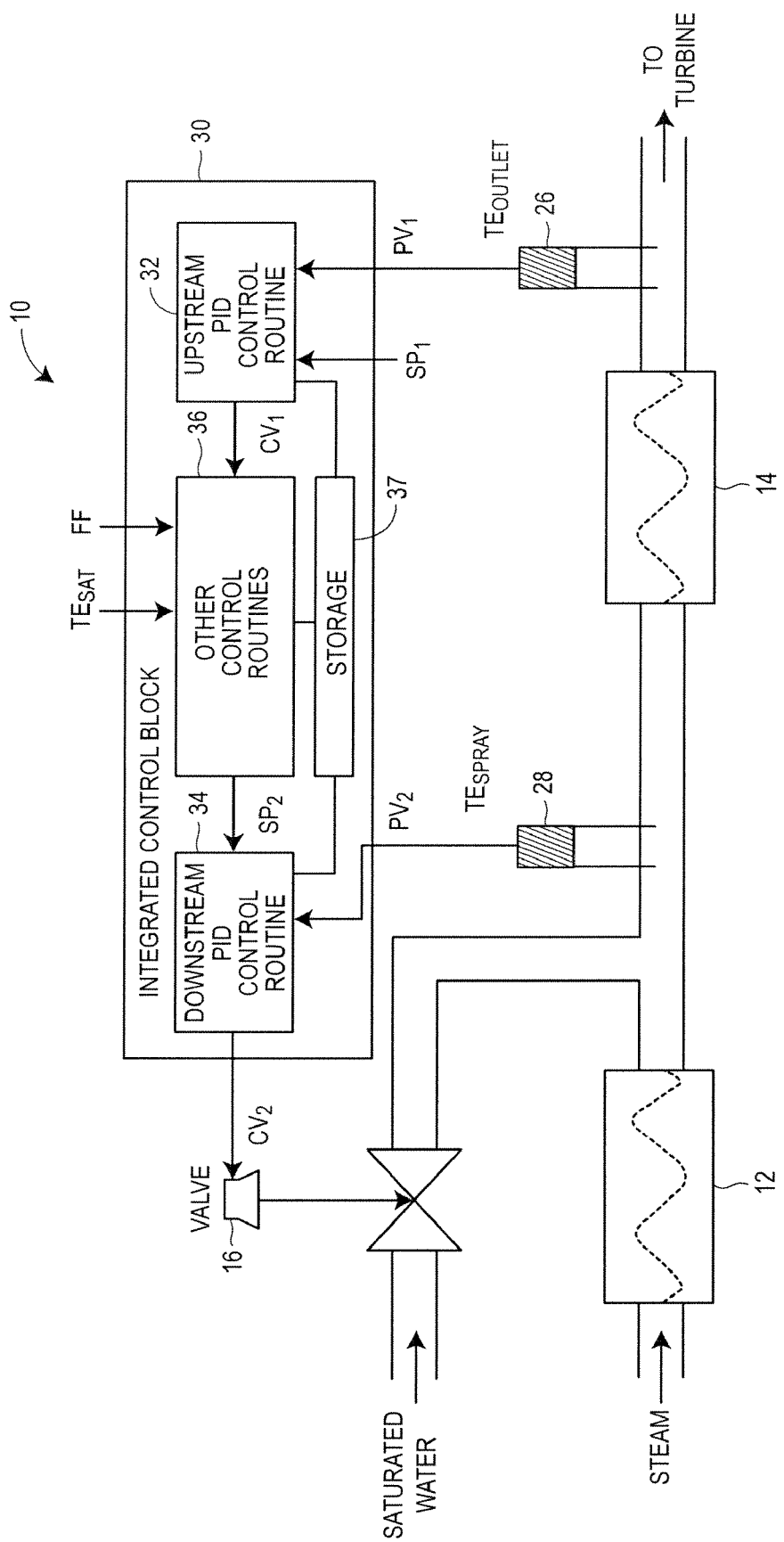
FIG. 2 is a schematic block diagram of a saturated water spraying system used in a boiler and including a control loop implemented with an integrated DCS control block.

The saturated water spraying system 10 may be reconfigured to rapidly respond to rapid load changes such as those described above by substituting a single integrated DCS control block 30 as shown in FIG. 2 for the cascaded function block configuration previously described. The integrate DCS control block 30 may include a plurality of process control routines that are necessary to control the operation of the spraying system, such as in the manner discussed above. For example, the integrated DCS control block 30 may include upstream and downstream PID control routines 32, 34, respectively, performing similar processing as the PID function blocks 18, 24, respectively, discussed above, and may include other control routines 36 as necessary to handle the disturbances within the boiler affecting the steam temperatures $TE_{OUTLET}$ and $TE_{SPRAY}$, and to ensure that the steam temperatures do not fall into the saturation region during operation of the boiler. Because the routines are part of the same control block 30, the common storage 37 for the control block 30 may be accessed by each of the routine 32-36 without the necessity of establishing additional communication links for transfeffing the information as is required when using the cascaded function blocks 18-24 as discussed above. By integrating the control functions in the same control block, mechanisms and processing can be provided within the integrated control block 30 to allow the downstream PID routine 34 to provide the upstream PD routine 32 with an indication of the first control variable $CV_1$ and/or second set point SP2 that are necessary to cause the downstream PID routine 34 to properly adjust the control valve 16 for control of the outlet steam temperature $TE_{OUTLET}$. Alternatively, the upstream PID routine 32 may be able to provide the downstream PID routine 34 with an indication of the difference between the first set point $SP_1$ and the first process variable $PV_1$ so that the downstream PID routine 34 may be able to override the calculated second control variable $CV_2$ and properly adjust the control valve 16. Consequently, the integrated DCS control block 30 may facilitate implementation of a more aggressive control strategy that may more quickly respond to rapid load changes within the spraying system 10.

As shown in FIG. 2, the information flow for process control by the integrated DCS control block 30 within the spraying system 10 is similar to the information flows between the components of the spraying system 10 and the function blocks 18-24 in the cascaded configuration. Consequently, the outlet steam temperature $TE_{OUTLET}$ is input to the integrated DCS control block 30 as the first process variable $PV_1$, and the desired outlet steam temperature is input as the first set point $SP_1$, and the input steam temperatures are processed by the upstream PID routine 32. Feed forward signals FF indicative of disturbances affecting the steam temperatures within the boiler are input for use by the other control routines 36 and, if necessary, a saturation override temperature $TE_{SAT}$ is provided and used by one of the other control routines 36 to ensure that the steam temperatures do not fall into the saturation region. Due to the integration of the processing within the integrated control block 30, the first control variable $CV_1$ and the second set point $SP_2$ become internal variables within the control block 30 instead of variables passed along communication links between the function blocks 18-24 during the performance of process control. The post-spray steam temperature $TE_{SPRAY}$ measured by the temperature sensor 28 is input to the control block 30 as the second process variable $PV_2$, and the control valve position determined by the downstream PID routine 34 is output to the control valve 16 as the second control variable $CV_2$.

Figure 3:
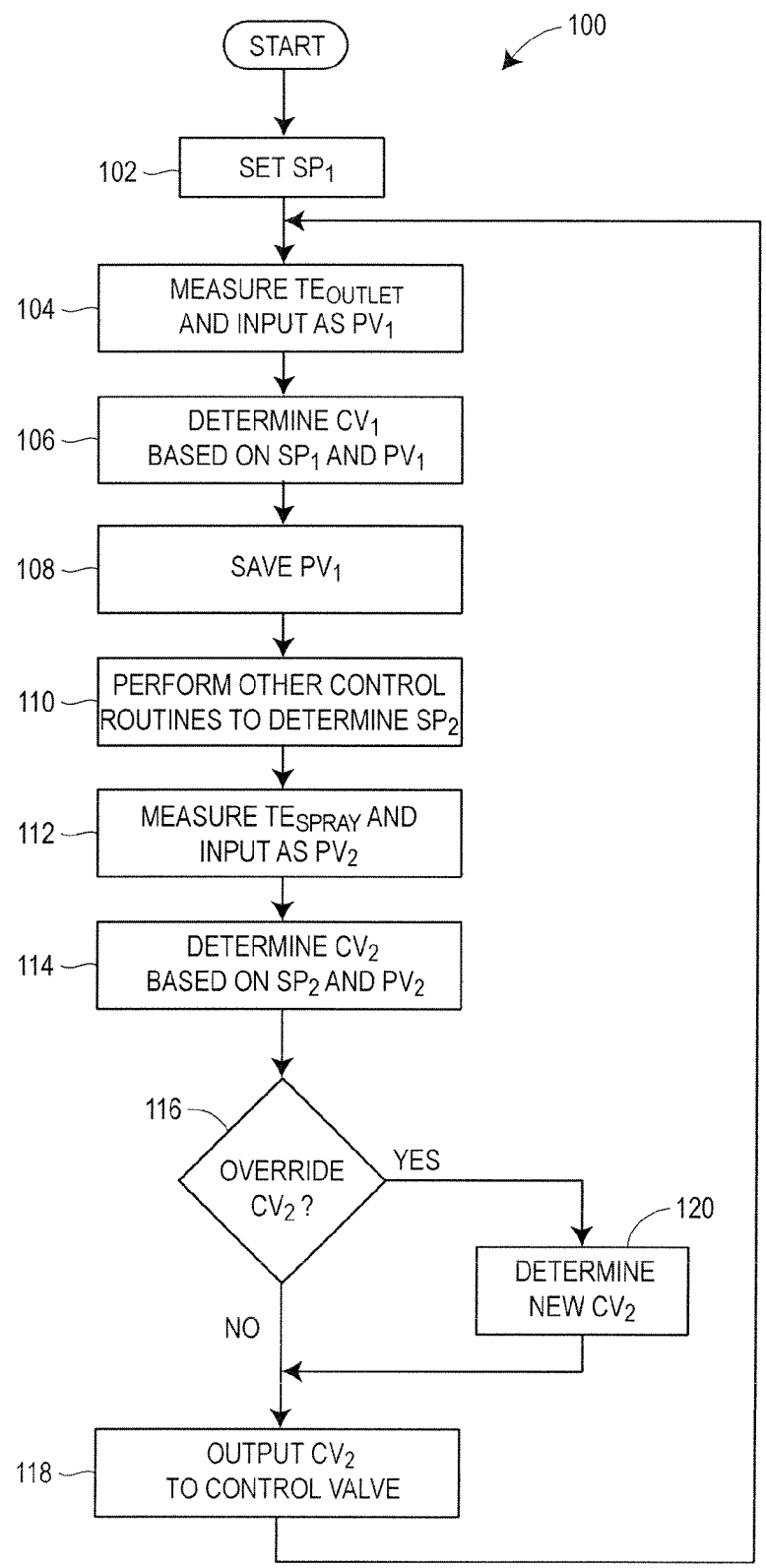
FIG. 3 is a flow diagram of a steam temperature control routine that may be implemented in the saturated water spraying system shown in FIG. 2 and wherein the downstream PID routine uses the outlet steam temperature $TE_{OUTLET}$ to determine whether to override the calculated control valve position.

The integrated DCS control block 30 facilitates rapid process control response to rapid load changes in the spraying system 10 such as those discussed above. Moreover, the integrated DCS control block 30 provides flexibility in the manner of identifying the conditions wherein the cascaded function block configuration discussed above would provide a sluggish response to rapid load changes. FIG. 3 illustrates one example of a steam temperature control routine 100 wherein the downstream PID control routine 34 is configured to identify the conditions necessitating the override or recalculation of the second control variable $CV_2$ output to the control valve 16 due to a rapid load change. The steam temperature control routine 100 may begin at a block 102 wherein an operator sets the first set point $SP_1$ input to the integrated control block 30 equal to the desired outlet steam temperature $TE_{OUTLET}$. Control then passes to a block 104 wherein the outlet steam temperature $TE_{OUTLET}$ is measured by the temperature sensor 26, and is input to the integrated DCS control block 30 as the first process variable $PV_1$.

With the first set point $SP_1$ and the first process variable $PV_1$ available to the integrated control block 30, the upstream PID control routine 32 may determine the first control variable $CV_1$ at a block 106 in a similar manner as previously discussed for the upstream PID function block 18. The upstream PID control routine 32 may be configured as necessary to determine the post-spray steam temperature $TE_{SPRAY}$ necessary to set the outlet steam temperature $TE_{OUTLET}$ equal the first set point $SP_1$. In addition to determining the first control variable $CV_1$, the upstream PID routine 32 may also save the first process variable $PV_1$ in the common storage area 37 for the integrated DCS control block 30 at a block 108 for later use by the downstream PID control routine 36.

The value of the first control variable $CV_1$ is used by the other control routines 36 at a block 110 to determine the second set point $SP_2$ to be used by the downstream PID control routine 34. The other control routines 36 may perform processing similar to the additional function blocks that may be provided in the cascade configuration discussed above. For example, the control routines 36 may include one or more summation routines that adjust the first control variable $CV_1$ in a similar manner as discussed for the summation function block 20. One or more feed forward signals FF relating to disturbances that may affect the steam temperatures $TE_{OUTLET}$ and $TE_{SPRAY}$ are input to the integrated DCS control block 30 and processed by corresponding summation control routines 36 to calculate intermediate control values $CV_1$. Further, if necessary, a saturation override temperature $TE_{SAT}$ may be input to the integrated DCS control block 30 for use by a HISELECT control routine 36 to ensure that the post-spray steam temperature $TE_{SPRAY}$ does not fall into the saturation region. After the necessary processing has been performed by the other control routines 36, the value of the second set point $SP_2$ is established for use by the downstream PID control routine 34.

The post-spray steam temperature $TE_{SPRAY}$ is measured by the temperature sensor 28, and is input to the integrated control block 30 as the second process variable $PV_2$ at a block 112. With the second set point $SP_2$ and the second process variable $PV_2$ available to the integrated control block 30, the downstream PID control routine 34 may determine the second control variable $CV_2$ at a block 114 in a similar manner as previously discussed for the downstream PID function block 24. The downstream PID control routine 34 may be configured as necessary to determine the control valve position necessary to increase or decrease the amount of saturated water sprayed into the steam flow path so that the post-spray steam temperature $TE_{SPRAY}$ will be equal to the second set point $SP_2$.

After determining the second control variable $CV_2$, control passes to a block 116 wherein the downstream PID control routine 34 of the integrated DCS control block 30 determines whether to override the calculated second control variable $CV_2$ in response to a rapid load change condition. In this embodiment, the downstream PID control routine 34 may retrieve the first process variable $PV_1$ and the first set point $SP_1$ stored in the memory 37 of the integrated DCS control block 30, and determine whether the calculated value of the second control variable $CV_2$ is consistent with the difference between the first process variable $PV_1$ and the first set point $SP_1$.

In addition to determining the first control variable $CV_1$, the upstream PD routine 32 may also save the first process variable $PV_1$ in the common storage area 37 for the integrated DCS control block 30 at a block 108 for later use by the downstream PID control routine 36. After the upstream PID routine 32 completes its processing, control passes to a block 110 wherein the other control routines 36 are executed to determine the second set point $SP_2$. As discussed above, the other control routines 36 may perform processing similar to that performed by the intermediate function blocks 20, 22 discussed above. The control routines 36 use the first control variable $CV_1$ and other signals input to the integrated DCS control block 30, such as the flow rate feed forward signal FF and the saturation override temperature $TE_{SAT}$ as discussed above, to determine the required post-spray steam temperature $TE_{SPRAY}$ represented by the second set point $SP_2$ and used as an input by the downstream PID routine 34.

As the integrated control block 30 executes the various control routines 32-36, the post-spray steam temperature $TE_{SPRAY}$ is measured by the temperature sensor 28, and is input to the integrated control block 30 as the second process variable $PV_2$ at a block 112. Within the integrated DCS control block 30, the second set point $SP_2$ and the second process variable $PV_2$ are used by the downstream PID routine 34 at a block 114 to determine the position of the control valve 16 necessary to adjust the post-spray steam temperature $TE_{SPRAY}$ to match the temperate of the second set point $SP_2$, and that will be output as the second control variable $CV_2$.

Before outputting the second control variable $CV_2$, however, the downstream PID control routine 34 may be configured to determine at a block 116 whether a rapid load condition exists such that it is necessary to override the calculated second control variable $CV_2$. In the illustrated embodiment, the downstream PID control routine 34 may compare the values of the first set point $SP_1$ and the first process variable $PV_1$ stored in the integrated DCS control block 30, and evaluate whether the calculated control valve position is consistent with the need to move the outlet steam temperature $TE_{OUTLET}$ toward the desired steam temperature. Under normal operating conditions where rapid load changes are not present, the second control variable $CV_2$ will set control valve 16 to an open position when the outlet steam temperature $TE_{OUTLET}$ is too high so that saturated water will be sprayed into the steam flow path to lower the steam temperatures $TE_{SPRAY}$ and $TE_{OUTLET}$. Conversely, the second control variable $CV_2$ will set control valve 16 to a closed or slightly open position when the outlet steam temperature $TE_{OUTLET}$ is too low so that amount of saturated water sprayed into the steam flow path is reduced, thereby raising the steam temperatures $TE_{SPRAY}$ and $TE_{OUTLET}$. When these conditions exist, control passes to a block 118 wherein the second control variable $CV_2$ is output to the control valve 16 to adjust the control valve 16 according to the control strategy.

During rapid load conditions, the value of the second control variable $CV_2$ and the corresponding adjustment of the control valve 16 can be inconsistent with the difference between the desired and actual outlet steam temperatures $TE_{OUTLET}$. If the calculated second control variable $CV_2$ is inconsistent with the first set point $SP_1$ and the second process variable $PV_1$, then control may pass from the block 116 to a block 120 wherein the downstream PID control routine 34 determines a new value for the second control variable $CV_2$ that is consistent with the first set point $SP_1$ and the second process variable $PV_1$. In the steam flow rate reduction example discussed above, the increased outlet steam temperature $TE_{OUTLET}$ may cause the upstream PID control routine 32 and other control routines 36 to determine that the post-spray steam temperature $TE_{SPRAY}$ should be lowered 850° F. ($SP_2$) by increasing the amount of saturated water sprayed into the steam flow path. However, the saturated water currently being sprayed into the steam flow path may cause the post-spray steam temperature $TE_{SPRAY}$ to rapidly drop to 700° F. ($PV_2$). Given these values of the second set point $SP_2$ and the second process value $PV_2$, the downstream PID control routine 34 would determine that the control valve 16 should be closed to raise the post-spray steam temperature $TE_{SPRAY}$, instead of opening the control valve 16 as dictated by the outlet steam temperature $TE_{OUTLET}$.

When such a condition causes control to pass to the block 120, the downstream PID control routine 34 determines a new value for the second control variable $CV2$ that will partially or fully open the control valve 16 so that the past-spray steam temperature $TE_{SPRAY}$ remains low enough to lower the outlet steam temperature $TE_{OUTLET}$ to the first set point $SP_1$. In one embodiment, the second control variable $CV_2$ may be set to fully open the control valve 16. Alternatively, the downstream PID control routine 34 may be configured to calculate a new second control variable $CV_2$ that will fully or partially open the control valve 16 to a position that will maintain a sufficiently low post-spray steam temperature $TE_{SPRAY}$. Once the new second control variable $CV_2$ is determined, control passes to the block 118 to output the new second control variable $CV_2$ to the control valve 16. After the second control variable $CV_2$ is output to the control valve 16, control passes back to the block 104 to reexecute the control loop. It will be apparent that the control loop implementing the integrated DCS control block 30 and the control routine 100 detects the occurrence of rapid load conditions during a single occurrence of the control loop.

Figure 4:
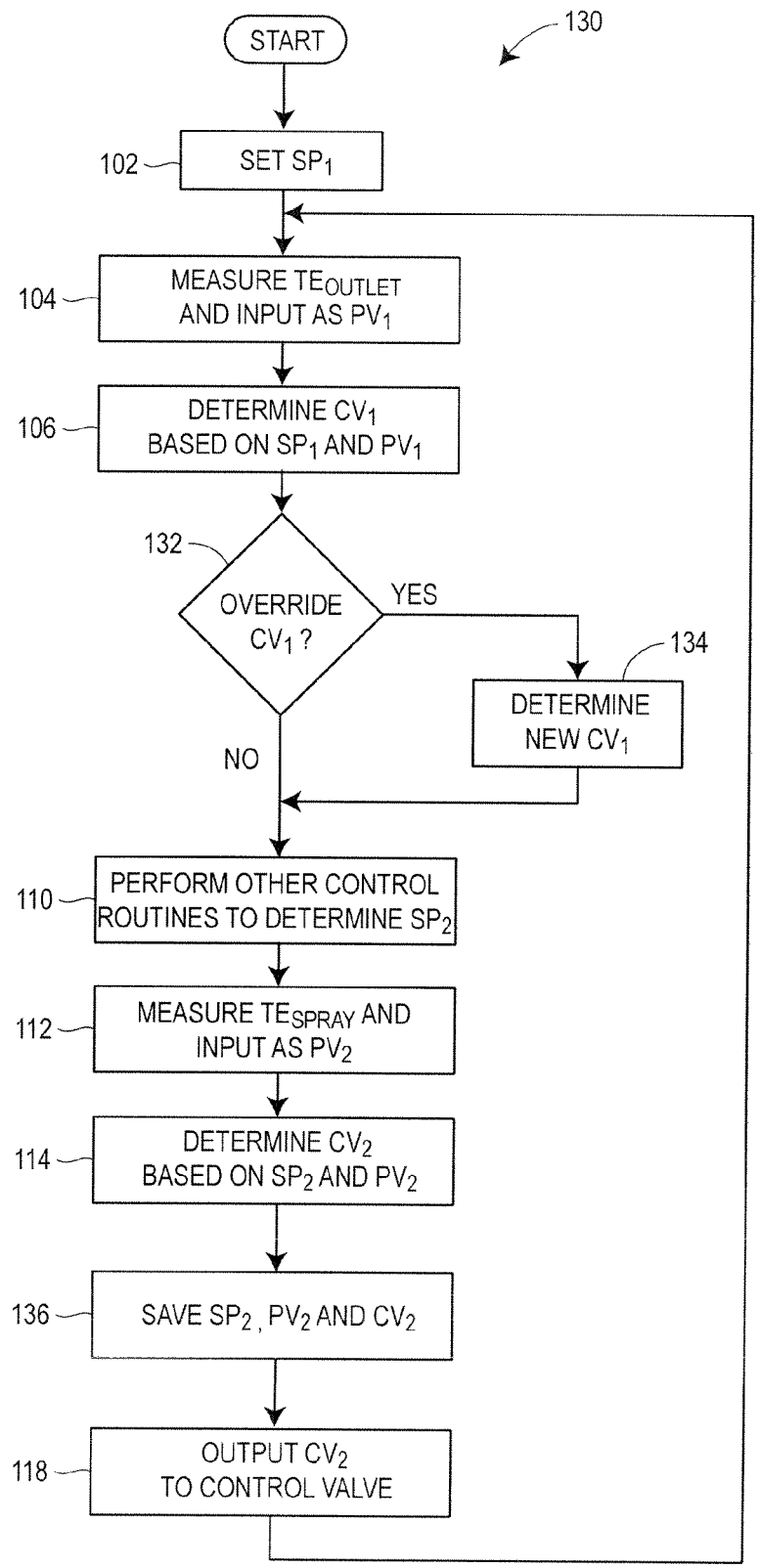
FIG. 4 is a flow diagram of a steam temperature control routine that may be implemented in the saturated water spraying system shown in FIG. 2 and wherein the upstream PID routine uses the post-spray steam temperature $TE_{SPRAY}$ and the control valve position to determine whether to override the calculated post-spray steam temperature $TE_{SPRAY}$.

FIG. 4 illustrates an alternative embodiment of a control loop routine 130 that may be implemented in the saturated water spraying system 10 having the integrated DCS control block 30. In this embodiment, the integrated DCS control block 30 is configured such that the upstream PID control routine 32 compares the calculated first control variable $CV_1$ to values of the second set point $SP_2$ and the second process variable $PV_2$ stored by the downstream PID control routine 34 during the previous execution of the control loop to determine whether rapid load condition exists and the calculated control variable $CV_1$ must be overridden. The routine 130 may begin in a similar manner as routine 100 with the first set point $SP_1$ being set at block 102, the outlet steam temperature $TE_{OUTLET}$ being measured and input as the first process variable $PV_1$ at the block 104, and the first control variable $CV_1$ being determined by the upstream PID control routine 32 at the block 106.

After determining the first control variable $CV_1$, control passes to a block 132 wherein the upstream PID control routine 132 compares the first control variable $CV_1$ and the necessary adjustment to the outlet steam temperature $TE_{OUTLET}$ to the stored value of the second process variable $PV_2$ stored by the downstream PID control routine 34 in the memory of the integrated DCS control block 30. If the value of the post-spray steam temperature $TE_{SPRAY}$ indicates that the control valve position that would be determined by the downstream PID control routine 34 is consistent with that necessary to move the actual outlet steam temperature $TE_{OUTLET}$ to the desired outlet steam temperature $TE_{OUTLET}$, then control passes to block 10 to output the first control variable $CV_1$ to the other control routines 36 for determination of the second set point $SP_2$. If the stored second process variable $CV_2$ will not result in the necessary adjustment to the control valve 16, control will pass to a block 134 to determine a new first control variable $CV_1$ that will cause the second control variable $CV_2$ calculated by the downstream PID control routine 34 to change the post-spray steam temperature $TE_{SPRAY}$ and ultimately the outlet steam temperature $TE_{OUTLET}$ in the correct direction. After the new first control variable $CV_1$ is calculated, the new first control variable $CV_1$ is passed to the other control routines 36 for execution of the block 110, followed by blocks 112 and 114 as discussed above. Control then passes to a block 136 wherein the downstream PID control routine 34 stores the values used by the upstream PID control routine 32 at block 132. Finally, the value of the second control variable $CV_2$ is output to the control valve 16 at the block 118, and control passes back to the block 104 to reexecute the control loop. As with the routine 100, the routine 130 allows rapid load conditions to be detected within a single execution of the control loop, and the position of the control valve 16 to be adjusted accordingly to reach and/or maintain the desired outlet steam temperature $TE_{OUTLET}$.

The integrated DCS control block 30 may be built by an operator using the standard control block configuration processing provided in distributed process control systems. The operator may use the configuration software at an operator terminal to select the PID control routines and other required control routines to define the inputs and outputs of the control block 30, and to define the processing occurring within and the information stored by and passed between the control routines. The configuration of the control block 30 with discrete control routines 32-36 facilitates real time display of the elements of the control block 30 and the data residing therein. When the control block 30 is configured, a limited number of known combinations of the known blocks are available. Each routine 32-36 is assigned an identifier that allows the display software to display the control routines in the correct order such that the processing occurring within the control block 30 is accurately displayed to the operator at the operator workstation. In this manner, the newly created integrated DCS control block 30 is displayed with the components broken out functionally.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A saturated water spraying system for maintaining a steam temperature in a boiler having superheated steam flowing along a flow path to a turbine, the system comprising:

a heat exchanger having an inlet and an outlet disposed along the steam flow path;

a control valve for regulating an amount of saturated water sprayed into the steam flow path at a point before the steam enters the heat exchanger;

a first temperature sensor disposed proximate the outlet of the heat exchanger and configured to measure an outlet steam temperature of the steam at the outlet of the heat exchanger;

a second temperature sensor disposed between the point at which the saturated water is sprayed into the steam flow path and the inlet of the heat exchanger and configured to measure a post-spray steam temperature of the steam after the saturated water is sprayed into the steam flow path; and an integrated distributed control system (DCS) control block operatively connected to the first temperature sensor, the second temperature sensor and the control valve, the integrated DCS control block having a first proportional integral derivative (PID) control routine and a second PID control routine, the first PID control routine being configured to use an actual outlet steam temperature received at the integrated DCS control block from the first temperature sensor as a first process variable, the first PID control routine being configured to compare the first process variable to a first set point that is equal to a desired outlet steam temperature and to determine a first control variable equal to a post-spray steam temperature that will result in the actual outlet steam temperature being equal to the first set point;

the second PID control routine being configured to use an actual post-spray steam temperature received at the integrated DCS control block from the second temperature sensor as a second process variable;

the second PID control routine being configured to compare the second process variable to a second set point determined from the first control variable and equal to a desired post-spray steam temperature and to determine a second control variable equal to a control valve position that will result in an amount of saturated water being sprayed into the fluid flow path that will cause the actual post-spray steam temperature to be equal to the second set point; and the second PID control routine being configured to output the second control value to the control valve, wherein the first PID control routine is configured to store the first process variable in storage of the integrated DCS control block, wherein the second PID control routine is configured to determine whether the control valve position of the second control variable will cause an amount of saturated water to be sprayed into the steam flow path that will cause the actual outlet steam temperature to equal the first set point based on the stored value of the first process variable and the first set point, wherein the second PID control routine is configured to determine a new second control variable for a control valve position that will cause the actual outlet steam temperature to equal the first set point in response to determining that the control valve position of the original second control variable will not cause the actual outlet steam temperature to equal the first set point, and wherein the second PID control routine is configured to output the new second control variable to the control valve instead of the original second control variable.

2. A saturated water spraying system according to claim 1, wherein the second PID control routine is configured to set the new second control variable equal to a fully open valve position in response to determining that the original second control variable is equal to a closed valve position and that the first process variable and the first set point indicate that the actual outlet spray temperature must be lowered to equal the first set point.

3. A saturated water spraying system according to claim 1, wherein the second PID control routine is configured to determine a new second control variable equal to an open valve position providing an amount of saturated water necessary to decrease the actual post-spray steam temperature to an amount that will lower the actual outlet spray temperature to equal the first set point in response to determining that the original second control variable is equal to a closed valve position and that the first process variable and the first set point indicate that the actual outlet spray temperature must be lowered to equal the first set point.

4. A saturated water spraying system according to claim 1, wherein the integrated DCS control block includes additional control routines configured to determine the second set point based on the value of the first control variable determined by the first PID control routine.

5. A saturated water spraying system for maintaining a steam temperature in a boiler having superheated steam flowing along a flow path to a turbine, the system comprising:

a heat exchanger having an inlet and an outlet disposed along the steam flow path;

a control valve for regulating an amount of saturated water sprayed into the steam flow path at a point before the steam enters the heat exchanger;

a first temperature sensor disposed proximate the outlet of the heat exchanger and configured to measure an outlet steam temperature of the steam at the outlet of the heat exchanger;

a second temperature sensor disposed between the point at which the saturated water is sprayed into the steam flow path and the inlet of the heat exchanger and configured to measure a post-spray steam temperature of the steam after the saturated water is sprayed into the steam flow path; and an integrated distributed control system (DCS) control block operatively connected to the first temperature sensor, the second temperature sensor and the control valve, the integrated DCS control block having a first proportional integral derivative (PID) control routine and a second PID control routine, the first PID control routine being configured to use an actual outlet steam temperature received at the integrated DCS control block from the first temperature sensor as a first process variable, the first PID control routine being configured to compare the first process variable to a first set point that is equal to a desired outlet steam temperature and to determine a first control variable equal to a post-spray steam temperature that will result in the actual outlet steam temperature being equal to the first set point;

the second PID control routine being configured to use an actual post-spray steam temperature received at the integrated DCS control block from the second temperature sensor as a second process variable;

the second PID control routine being configured to compare the second process variable to a second set point determined from the first control variable and equal to a desired post-spray steam temperature and to determine a second control variable equal to a control valve position that will result in an amount of saturated water being sprayed into the fluid flow path that will cause the actual post-spray steam temperature to be equal to the second set point; and the second PID control routine being configured to output the second control value to the control valve, wherein the second PID control routine is configured to store the second process variable in storage of the integrated DCS control block, wherein the first PID control routine is configured to determine whether the control valve position of the second control variable that would be calculated by the second PID control routine based on the first control variable and the stored second process variable will cause an amount of saturated water to be sprayed into the steam flow path that will cause the actual outlet steam temperature to equal the first set point based on the values of the first process variable and the first set point, and wherein the first PID control routine is configured to determine a new first control variable for a post-spray steam temperature that will cause the second PID control routine to calculate a second control variable with a control valve position that will cause the actual outlet steam temperature to equal the first set point in response to determining that the post-spray steam temperature of the original first control variable will not cause the actual outlet steam temperature to equal the first set point.

6. A saturated water spraying system according to claim 5, wherein the first PID control routine is configured to set the new first control variable equal to a desired post-spray steam temperature that will cause the second PID control routine to calculate a second control variable equal to a fully open valve position in response to determining that the original first control variable would cause the second PID control routine to calculate a second control variable equal to a closed valve position and that the first process variable and the first set point indicate that the actual outlet spray temperature must be lowered to equal the first set point.

7. A saturated water spraying system according to claim 5, wherein the first PID control routine is configured to determine a new first control variable equal to a desired post-spray steam temperature that will cause the second PID control routine to calculate a second control variable equal to an open valve position providing an amount of saturated water necessary to decrease the actual post-spray steam temperature to an amount that will lower the actual outlet spray temperature to equal the first set point in response to determining that the original first control variable would cause the second PID control routine to calculate a second control variable equal to a closed valve position and that the first process variable and the first set point indicate that the actual outlet spray temperature must be lowered to equal the first set point.

8. A saturated water spraying system according to claim 5, wherein the integrated DCS control block includes additional control routines configured to determine the second set point based on the value of the first control variable determined by the first PID control routine.

9. A method for maintaining a steam temperature in a boiler having superheated steam flowing along a flow path through a heat exchanger and on to a turbine with an outlet steam temperature at the outlet of the heat exchanger, wherein saturated water is sprayed into the steam flow path before the steam enters the heat exchanger with the steam having a post-spray steam temperature after the saturated water is sprayed into the steam flow path, and wherein the boiler includes a control valve for regulating the amount of saturated water sprayed into the steam flow path, comprising:

measuring the actual outlet steam temperature;

inputting the actual outlet steam temperature to a first proportional integral derivative (PID) control routine of an integrated distributed control system (DCS) control block as a first process variable;

storing the first process variable in storage of the integrated DCS control block;

at the first PID control routine comparing the first process variable to a first set point that is equal to a desired outlet steam temperature and determining a first control variable equal to a post-spray steam temperature that will result in the actual outlet steam temperature being equal to the first set point;

measuring the actual post-spray steam temperature;

inputting the actual post-spray steam temperature to a second PID control routine of the integrated DCS control block as a second process variable;

at the second PID control routine comparing the second process variable to a second set point determined from the first control variable and equal to a desired post-spray steam temperature and determining a second control variable equal to a control valve position that will result in an amount of saturated water being sprayed into the fluid flow path that will cause the actual post-spray steam temperature to be equal to the second set point;

at the second PID control routine determining whether the control valve position of the second control variable will cause an amount of saturated water to be sprayed into the steam flow path that will cause the actual outlet steam temperature to equal the first set point based on the stored value of the first process variable and the first set point;

outputting the second control value from the second PID control routine of the integrated DCS control block to the control valve in response to determining that the control valve position of the original second control variable will cause the actual outlet steam temperature to equal the first set point;

at the second PID control routine determining a new second control variable for a control valve position that will cause the actual outlet steam temperature to equal the first set point and outputting the new second control variable to the control valve instead of the original second control variable in response to determining that the control valve position of the original second control variable will not cause the actual outlet steam temperature to equal the first set point.

10. A method according to claim 9, comprising setting the new second control variable equal to a fully open valve position in response to determining that the original second control variable is equal to a closed valve position and that the first process variable and the first set point indicate that the actual outlet spray temperature must be lowered to equal the first set point.

11. A method according to claim 9, comprising determining a new second control variable equal to an open valve position providing an amount of saturated water necessary to decrease the actual post-spray steam temperature to an amount that will lower the actual outlet spray temperature to equal the first set point in response to determining that the original second control variable is equal to a closed valve position and that the first process variable and the first set point indicate that the actual outlet spray temperature must be lowered to equal the first set point.

12. A method according to claim 9, wherein the integrated DCS control block includes additional control routines, the method comprising at the additional control routines determining the second set point based on the value of the first control variable determined by the first PID control routine.

13. A method for maintaining a steam temperature in a boiler having superheated steam flowing along a flow path through a heat exchanger and on to a turbine with an outlet steam temperature at the outlet of the heat exchanger, wherein saturated water is sprayed into the steam flow path before the steam enters the heat exchanger with the steam having a post-spray steam temperature after the saturated water is sprayed into the steam flow path, and wherein the boiler includes a control valve for regulating the amount of saturated water sprayed into the steam flow path, comprising:
   measuring the actual outlet steam temperature;
   inputting the actual outlet steam temperature to a first proportional integral derivative (PID) control routine of an integrated distributed control system (DCS) control block as a first process variable;
   at the first PID control routine comparing the first process variable to a first set point that is equal to a desired outlet steam temperature and determining a first control variable equal to a post-spray steam temperature that will result in the actual outlet steam temperature being equal to the first set point;
   measuring the actual post-spray steam temperature;
   inputting the actual post-spray steam temperature to a second PID control routine of the integrated DCS control block as a second process variable;
   at the second PID control routine storing the second process variable in storage of the integrated DCS control block;
   at the second PID control routine comparing the second process variable to a second set point determined from the first control variable and equal to a desired post-spray steam temperature and determining a second control variable equal to a control valve position that will result in an amount of saturated water being sprayed into the fluid flow path that will cause the actual post-spray steam temperature to be equal to the second set point;
   outputting the second control value from the second PID control routine of the integrated DCS control block to the control valve;
   at the first PID control routine determining whether the control valve position of the second control variable that would be calculated by the second PID control routine based on the first control variable and the stored second process variable will cause an amount of saturated water to be sprayed into the steam flow path that will cause the actual outlet steam temperature to equal the first set point based on the values of the first process variable and the first set point; and
   at the first PID control routine determining a new first control variable for a post-spray steam temperature that will cause the second PID control routine to calculate a second control variable with a control valve position that will cause the actual outlet steam temperature to equal the first set point in response to determining that the post-spray steam temperature of the original first control variable will not cause the actual outlet steam temperature to equal the first set point.

14. A method according to claim 13, comprising setting the new first control variable equal to a desired post-spray steam temperature that will cause the second PID control routine to calculate a second control variable equal to a fully open valve position in response to determining that the original first control variable would cause the second PID control routine to calculate a second control variable equal to a closed valve position and that the first process variable and the first set point indicate that the actual outlet spray temperature must be lowered to equal the first set point.

15. A method according to claim 13, comprising determining a new first control variable equal to a desired post-spray steam temperature that will cause the second PID control routine to calculate a second control variable equal to an open valve position providing an amount of saturated water necessary to decrease the actual post-spray steam temperature to an amount that will lower the actual outlet spray temperature to equal the first set point in response to determining that the original first control variable would cause the second PID control routine to calculate a second control variable equal to a closed valve position and that the first process variable and the first set point indicate that the actual outlet spray temperature must be lowered to equal the first set point.

16. A method according to claim 13, wherein the integrated DCS control block includes additional control routines, the method comprising at the additional control routines determining the second set point based on the value of the first control variable determined by the first PID control routine.

17. An integrated distributed control system (DCS) control block in a saturated water spraying system for maintaining a steam temperature in a boiler having superheated steam flowing along a flow path to a turbine, wherein the system includes a heat exchanger having an inlet and an outlet disposed along the steam flow path, a control valve for regulating an amount of saturated water sprayed into the steam flow path at a point before the steam enters the heat exchanger, a first temperature sensor disposed proximate the outlet of the heat exchanger and configured to measure an outlet steam temperature of the steam at the outlet of the heat exchanger, and a second temperature sensor disposed between the point at which the saturated water is sprayed into the steam flow path and the inlet of the heat exchanger and configured to measure a post-spray steam temperature of the steam after the saturated water is sprayed into the steam flow path, the integrated DCS control block being operatively connected to the first temperature sensor, the second temperature sensor and the control valve, the integrated DCS control block comprising:
   a first proportional integral derivative (PID) control routine configured to use an actual outlet steam temperature received at the integrated DCS control block from the first temperature sensor as a first process variable, and configured to compare the first process variable to a first set point that is equal to a desired outlet steam temperature and to determine a first control variable equal to a post-spray steam temperature that will result in the actual outlet steam temperature being equal to the first set point; and
   a second PID control routine configured to use an actual post-spray steam temperature received at the integrated DCS control block from the second temperature sensor as a second process variable, configured to compare the second process variable to a second set point determined from the first control variable and equal to a desired post-spray steam temperature and to determine a second control variable equal to a control valve position that will result in an amount of saturated water being sprayed into the fluid flow path that will cause the actual post-spray steam temperature to be equal to the second set point, and configured to output the second control value to the control valve, wherein the first PID control routine is configured to store the first process variable in storage of the integrated DCS control block, wherein the second PID control routine is configured to determine whether the control valve position of the second control variable will cause an amount of saturated water to be sprayed into the steam flow path that will cause the actual outlet steam temperature to equal the first set point based on the stored value of the first process variable and the first set point, wherein the second PID control routine is configured to determine a new second control variable for a control valve position that will cause the actual outlet steam temperature to equal the first set point in response to determining that the control valve position of the original second control variable will not cause the actual outlet steam temperature to equal the first set point, and wherein the second PID control routine is configured to output the new second control variable to the control valve instead of the original second control variable.

18. An integrated DCS control block according to claim 17, wherein the second PID control routine is configured to set the new second control variable equal to a fully open valve position in response to determining that the original second control variable is equal to a closed valve position and that the first process variable and the first set point indicate that the actual outlet spray temperature must be lowered to equal the first set point.

19. An integrated DCS control block according to claim 17, wherein the second PID control routine is configured to determine a new second control variable equal to an open valve position providing an amount of saturated water necessary to decrease the actual post-spray steam temperature to an amount that will lower the actual outlet spray temperature to equal the first set point in response to determining that the original second control variable is equal to a closed valve position and that the first process variable and the first set point indicate that the actual outlet spray temperature must be lowered to equal the first set point.

20. An integrated DCS control block according to claim 17, comprising additional control routines configured to determine the second set point based on the value of the first control variable determined by the first PID control routine.

21. An integrated distributed control system (DCS) control block in a saturated water spraying system for maintaining a steam temperature in a boiler having superheated steam flowing along a flow path to a turbine, wherein the system includes a heat exchanger having an inlet and an outlet disposed along the steam flow path, a control valve for regulating an amount of saturated water sprayed into the steam flow path at a point before the steam enters the heat exchanger, a first temperature sensor disposed proximate the outlet of the heat exchanger and configured to measure an outlet steam temperature of the steam at the outlet of the heat exchanger, and a second temperature sensor disposed between the point at which the saturated water is sprayed into the steam flow path and the inlet of the heat exchanger and configured to measure a post-spray steam temperature of the steam after the saturated water is sprayed into the steam flow path, the integrated DCS control block being operatively connected to the first temperature sensor, the second temperature sensor and the control valve, the integrated DCS control block comprising:

a first proportional integral derivative (PID) control routine configured to use an actual outlet steam temperature received at the integrated DCS control block from the first temperature sensor as a first process variable, and configured to compare the first process variable to a first set point that is equal to a desired outlet steam temperature and to determine a first control variable equal to a post-spray steam temperature that will result in the actual outlet steam temperature being equal to the first set point; and a second PID control routine configured to use an actual post-spray steam temperature received at the integrated DCS control block from the second temperature sensor as a second process variable, configured to compare the second process variable to a second set point determined from the first control variable and equal to a desired post-spray steam temperature and to determine a second control variable equal to a control valve position that will result in an amount of saturated water being sprayed into the fluid flow path that will cause the actual post-spray steam temperature to be equal to the second set point, and configured to output the second control value to the control valve, wherein the second PID control routine is configured to store the second process variable in storage of the integrated DCS control block, wherein the first PD control routine is configured to determine whether the control valve position of the second control variable that would be calculated by the second PID control routine based on the first control variable and the stored second process variable will cause an amount of saturated water to be sprayed into the steam flow path that will cause the actual outlet steam temperature to equal the first set point based on the values of the first process variable and the first set point, and wherein the first PID control routine is configured to determine a new first control variable for a post-spray steam temperature that will cause the second PID control routine to calculate a second control variable with a control valve position that will cause the actual outlet steam temperature to equal the first set point in response to determining that the post-spray steam temperature of the original first control variable will not cause the actual outlet steam temperature to equal the first set point.

22. An integrated DCS control block according to claim 21, wherein the first PID control routine is configured to set the new first control variable equal to a desired post-spray steam temperature that will cause the second PID control routine to calculate a second control variable equal to a fully open valve position in response to determining that the original first control variable would cause the second PID control routine to calculate a second control variable equal to a closed valve position and that the first process variable and the first set point indicate that the actual outlet spray temperature must be lowered to equal the first set point.

23. An integrated DCS control block according to claim 21, wherein the first PID control routine is configured to determine a new first control variable equal to a desired post-spray steam temperature that will cause the second PID control routine to calculate a second control variable equal to an open valve position providing an amount of saturated water necessary to decrease the actual post-spray steam temperature to an amount that will lower the actual outlet spray temperature to equal the first set point in response to determining that the original first control variable would cause the second PID control routine to calculate a second control variable equal to a closed valve position and that the first process variable and the first set point indicate that the actual outlet spray temperature must be lowered to equal the first set point.

24. An integrated DCS control block according to claim 21, comprising additional control routines configured to determine the second set point based on the value of the first control variable determined by the first PID control routine.

* * * * *

UNITED STATES PATENT AND TRADEMARK OFFICE
CERTIFICATE OF CORRECTION

| | | |
|---|---|---|
| PATENT NO. | : 7,668,623 B2 | Page 1 of 1 |
| APPLICATION NO. | : 11/780969 | |
| DATED | : February 23, 2010 | |
| INVENTOR(S) | : Richard W. Kephart et al. | |

It is certified that error appears in the above-identified patent and that said Letters Patent is hereby corrected as shown below:

In the Specification:

At Column 6, line 30, "transfeffing" should be -- transferring --.

Signed and Sealed this

Twenty-eighth Day of September, 2010

David J. Kappos
*Director of the United States Patent and Trademark Office*